(12) United States Patent
Mizumoto et al.

(10) Patent No.: US 9,827,700 B2
(45) Date of Patent: Nov. 28, 2017

(54) COMPONENT FOR FASTENERS, SLIDE FASTENER AND METHOD FOR MANUFACTURING COMPONENT FOR FASTENERS

(71) Applicant: YKK Corporation, Tokyo (JP)

(72) Inventors: Kazuya Mizumoto, Toyama (JP); Tatsurou Nara, Toyama (JP)

(73) Assignee: YKK Corporation (JP)

( * ) Notice: Subject to any disclaimer, the term of this patent is extended or adjusted under 35 U.S.C. 154(b) by 0 days.

(21) Appl. No.: 14/891,583

(22) PCT Filed: Jun. 13, 2013

(86) PCT No.: PCT/JP2013/066368
§ 371 (c)(1),
(2) Date: Nov. 16, 2015

(87) PCT Pub. No.: WO2014/199492
PCT Pub. Date: Dec. 18, 2014

(65) Prior Publication Data
US 2017/0001348 A1 Jan. 5, 2017

(51) Int. Cl.
*C09D 175/04* (2006.01)
*B29C 45/16* (2006.01)
(Continued)

(52) U.S. Cl.
CPC .............. *B29C 45/16* (2013.01); *A44B 19/00* (2013.01); *A44B 19/24* (2013.01); *A44B 19/42* (2013.01);
(Continued)

(58) Field of Classification Search
CPC .. C08G 18/12; C08G 18/302; C08G 18/6685; C08G 18/3206; C08G 18/324;
(Continued)

(56) References Cited

U.S. PATENT DOCUMENTS 5,035,029 A * 7/1991 Horita .................... A44B 19/02
24/394
6,230,373 B1 5/2001 Wakai et al.
(Continued)

FOREIGN PATENT DOCUMENTS

EP 0387905 A2 9/1990
EP 0862869 A2 9/1998
(Continued)

OTHER PUBLICATIONS

International Preliminary Report on Patentability, PCT Application No. PCT/JP2013/066368, dated Dec. 23, 2015.
(Continued)

*Primary Examiner* — Robert Sandy
*Assistant Examiner* — David M Upchurch
(74) *Attorney, Agent, or Firm* — Kilpatrick Townsend & Stockton LLP (57) ABSTRACT

A component for fasteners, including a molded component formed of a polyamide resin composition including reinforcing fiber, wherein a dyed layer being dyed inward from a surface of the molded component is disposed, and the thickness of the dyed layer is 30 to 100 μm.

10 Claims, 3 Drawing Sheets

(51) Int. Cl.

| | | |
|---|---|---|
| *A44B 19/00* | (2006.01) | |
| *A44B 19/42* | (2006.01) | |
| *A44B 19/24* | (2006.01) | |
| *B29C 45/00* | (2006.01) | |
| *B29C 45/47* | (2006.01) | |
| *B29D 5/00* | (2006.01) | |
| B29K 77/00 | (2006.01) | |
| B29K 105/12 | (2006.01) | |
| B29K 309/08 | (2006.01) | |
| B29L 5/00 | (2006.01) | |

(52) U.S. Cl.
CPC .......... *B29C 45/0001* (2013.01); *B29C 45/47* (2013.01); *B29D 5/00* (2013.01); *B29K 2077/00* (2013.01); *B29K 2105/12* (2013.01); *B29K 2309/08* (2013.01); *B29K 2995/002* (2013.01); *B29L 2005/00* (2013.01)

(58) Field of Classification Search
CPC ............ C08G 18/4812; C08G 18/4825; C08G 18/4829; C08G 18/6674; C08G 18/755; C08K 5/0016; C09D 175/04; C09D 175/08; C09D 7/12
See application file for complete search history.

(56) References Cited

U.S. PATENT DOCUMENTS

| | | | |
|---|---|---|---|
| 6,548,165 B2* | 4/2003 | Yamakita ............... | A44B 19/34 428/353 |
| 8,966,719 B2* | 3/2015 | Kamada ................. | A44B 19/12 24/391 |
| 2011/0124789 A1* | 5/2011 | Choi .......................... | C08J 3/12 524/420 |
| 2013/0019442 A1 | 1/2013 | Yamakita et al. | |

FOREIGN PATENT DOCUMENTS

| | | |
|---|---|---|
| EP | 1116451 A1 | 7/2001 |
| EP | 2556766 A1 | 2/2013 |
| JP | 3-012103 A | 1/1991 |
| JP | 10-243805 A | 9/1998 |
| JP | 2001-342305 A | 12/2001 |
| JP | 4517277 B2 | 8/2010 |
| JP | 2010-538104 A | 12/2010 |
| WO | 2009/028878 A2 | 3/2009 |
| WO | 2011/125176 A1 | 10/2011 |

OTHER PUBLICATIONS

International Search Report, PCT Application No. PCT/JP2013/066368, dated Sep. 17, 2013.

* cited by examiner

COMPONENT FOR FASTENERS, SLIDE FASTENER AND METHOD FOR MANUFACTURING COMPONENT FOR FASTENERS

This application is a national stage application of PCT/JP2013/066368, which is incorporated herein by reference.

TECHNICAL FIELD

The present invention relates to a component for fasteners, a slide fastener and a method for manufacturing a component for fasteners.

BACKGROUND ART

A slide fastener is an opening and closing device for an article utilized in not only daily necessities such as clothing, bags, shoes and general merchandise but also in industrial goods such as a water tank, a fishing net and a space suit. In a slide fastener the elements of which are made of a resin, among the components of the slide fastener, the components for fasteners such as the elements, the slider, the top end and bottom end stops, and the opening device are typically molded components manufactured by means of injection molding, and it is known that these components can be manufactured by using a polyester resin and/or a polyamide resin as a material. And then, in some cases, these molded components may be required to be dyed in a desired color in order to enhance design.

In this respect, Japanese Patent No. 4517277 (Patent Literature 1) describes an invention directed toward dyeing cloth and a slide fastener composed of components made of a resin so that the both have the same apparent color tone when dyeing the both in the same bath. The patent publication discloses a component for slide fasteners composed of a resin composition, the resin composition comprising an ingredient (A) and at least one ingredient selected from the group consisting of (B), (C), (D) and (E), the component for slide fasteners having a satin-finished surface with a ten-point average surface roughness of 7 to 200 μm, and the ingredients (A), (B), (C), (D) and (E) being as follows:

(A) a polyester resin and/or a polyamide resin;
(B) a polyolefin-based polymer, a polyester-based polymer or an acryl-based polymer having a glass transition temperature of 0° C. or below dispersed as a domain having a mean dispersed particle size of 0.1 to 2 μm in a matrix of (A);
(C) at least one inorganic compound selected from the group consisting of titanium compounds, zinc compounds and silicon compounds;
(D) at least one fibrous reinforcing material from the group consisting of glass fiber, an acicular wollastonite and aramid fiber;
(E) at least one mold-releasing agent selected from the group consisting of silicone compounds, higher aliphatic acid ester compounds and higher aliphatic acid salt compounds.

According to Patent Literature 1, it is stated that the effect of the satin-finished surface is evaluated by gloss difference between the mirror surface and the satin-finished surface or brightness difference and satin finish-processing giving a brightness difference from the cloth of 10 or less, preferably 8 or less is utilized. In addition, it is stated that a satin-finished surface having a ten-point average surface roughness, preferably, of 7 to 200 μm, and particularly, of 10 to 150 μm is made in order to reduce the brightness difference. In the examples, results of dyeing molded polyester articles which were satin finish-processed and cloth in the same bath are shown and it is stated that the molded articles having a predetermined ten-point average surface roughness exhibited a close color tone to that of the cloth upon dyeing in the same bath as the cloth.

CITATION LIST

Patent Literature

Patent Literature 1: Japanese Patent No. 4517277

SUMMARY OF INVENTION

Technical Problem

However, Patent Literature 1 focuses on controlling the color tone upon dyeing molded products made of a resin and cloth in the same bath, and is insufficient in a study for achieving the compatibility among the strength required for fasteners and the manufacturing efficiency and color reproducibility during dyeing.

In other words, in manufacturing components for fasteners, the dyeing operation of components for fasteners has been required to be performed efficiently in a shorter time, in order to enhance the manufacturing efficiency while maintaining high strength. However, when a dyed layer is intended to be formed in a short time by reducing the amount of the dye used, color unevenness sometimes occurs to prevent the reproduction of the desired color.

The present invention has been created in view of the above-described circumstances and the subjects of the present invention is to provide a component for fasteners capable of being dyed with small amounts of dyes while maintaining high strength and excellent in color reproducibility, a slide fastener and a method for manufacturing a component for fasteners.

Solution to Problem

The present inventors have intensively studied in order to solve the subjects described above, and consequently have found that in order to achieve the compatibility among the strength and the manufacturing efficiency and color reproducibility, it is effective to use a polyamide resin comprising reinforcing fiber as a material for the component for fasteners and to form a dyed layer having a predetermined thickness on the surface.

The present invention has been accomplished on the basis of the findings described above, and in one aspect, is a component for fasteners, comprising a molded component formed of a polyamide resin composition including reinforcing fiber, wherein a dyed layer is disposed from the surface of the molded component in the inside direction, and the thickness of the dyed layer is 30 to 100 μm.

In an embodiment of the component for fasteners according to the present invention, when the color of the central part of the cross section of the molded component is evaluated according to JIS Z8729: 2004 (color specification), the L*, a* and b* values satisfy the following ranges, respectively:

80<L*<95, −5<a*<5, and 0<b*<10.

In another embodiment of the component for fasteners according to the present invention, the reinforcing fiber is included in a content of 20 to 70% by mass.

In another embodiment of the component for fasteners according to the present invention, when the colors of arbitrary 10 points on the surface of the dyed layer are measured, the average value of the color differences ($\Delta E^*ab$), from the average value of the 10 points, of the respective measurement points is 1.0 or less.

In yet another embodiment of the component for fasteners according to the present invention, the polyamide resin composition includes an aliphatic polyamide, and the reinforcing fiber is glass fiber.

In yet another embodiment of the component for fasteners according to the present invention, the polyamide resin composition includes, in addition to the reinforcing fiber, a polyamide resin having a melting point of 210° C. or higher and lower than 310° C., and a pigment having a Mohs hardness of 4 or less and a refractive index of 2 or more in a content of 0.5% by mass or more and less than 5% by mass.

In another aspect, the present invention is a slide fastener comprising the component for fasteners.

In yet another aspect, the present invention is a method for manufacturing a component for fasteners, comprising: (a) manufacturing a molded component using a polyamide resin composition including reinforcing fiber; and (b) forming a dyed layer having a thickness of 30 to 100 μm, inward from the surface of the molded component.

In an embodiment of the method for manufacturing a component for fasteners according to the present invention, in the step (a), the color of the molded component is regulated in such a way that when the color of the central part of the cross section of the molded component is evaluated according to JIS Z8729: 2004 (color specification), the $L^*$, $a^*$ and $b^*$ values satisfy the following ranges, respectively:

$80 < L^* < 95$, $-5 < a^* < 5$, and $0 < b^* < 10$.

In another embodiment of the method for manufacturing a component for fasteners according to the present invention, in the step (a), the reinforcing fiber is included in a content of 20 to 70% by mass.

Advantageous Effects of Invention

According to the present invention, it is possible to provide a component for fasteners capable of being dyed with a small amount of a dye while maintaining high strength and excellent in color reproducibility, a slide fastener and a method for manufacturing a component for fasteners.

BRIEF DESCRIPTION OF DRAWINGS

FIG. 2(a) shows the case where no reinforcing fiber is included in a polyamide resin, FIG. 2(b) shows the case where reinforcing fiber is included in the polyamide resin in a content of 20% by mass, FIG. 2(c) shows the case where reinforcing fiber is included in the polyamide resin in a content of 30% by mass, FIG. 2(d) shows the case where reinforcing fiber is included in the polyamide resin in a content of 60% by mass, and FIG. 2(e) shows the case where reinforcing fiber is included in a polybutylene terephthalate resin in a content of 30% by mass.

DESCRIPTION OF EMBODIMENTS (Molded Component)

The component for fasteners according to an embodiment of the present invention comprises a molded component formed of a polyamide resin composition including reinforcing fiber, and a dyed layer being dyed inward from the surface of the molded component.

By adopting a polyamide resin composition including reinforcing fiber as the material for the dyed component for fasteners, the strength decrease after dyeing can be made smaller and the dyed layer can be formed thinner in thickness as compared with conventional fastener component materials such as polyester. Because the dyed layer can be formed thinner in thickness, the amount of the dye required for dyeing can be reduced, the dyeing operation takes a shorter time, and hence the dyeing operation can be made efficient.

The polyamide resin usable is not particularly limited, but polyamides have different melting points depending on molecular structure thereof, and the higher melting point a polyamide resin has, the more the molding temperature thereof is raised, thereby easily causing yellowing. Therefore, a polyamide resin having a melting point below 310° C. is preferably used, more preferably a polyamide resin having a melting point of 305° C. or below is used, and still more preferably a polyamide resin having a melting point of 300° C. or below is used. In addition, since a polyamide resin with a lower melting point has a less number of the amide linkage per unit molecular structure and has a more flexible chain, thereby tending to have lower strength and rigidity, a polyamide resin having a melting point of 210° C. or above is preferably used, more preferably a polyamide resin having a melting point of 240° C. or above is used, and still more preferably a polyamide resin having a melting point of 250° C. or above is used.

In the present invention, the melting point of the polyamide resin is defined as the peak top temperature of the endothermic peak when the endothermic quantity is measured by a DSC (differential scanning calorimeter). When a plurality of polyamide resins are used, the melting point is defined as the peak top temperature of the endothermic peak of the highest temperature side.

A polyamide resin is obtained by copolycondensation of a diamine and a dicarboxylic acid, polycondensation of an ω-aminoacid, ring-opening polymerization of a lactam and the like. The diamine includes, for example, straight-chain or branched-chain aliphatic diamines, such as ethylenediamine, propylenediamine, butylenediamine, hexamethylenediamine, 2-methylpropanediamine, 3-methylpropanediamine, octamethylenediamine, decanediamine and dodecanediamine; aromatic diamines, such as meta-xylylenediamine, para-xylylenediamine, meta-phenylenediamine and para-phenylenediamine; alicyclic diamines, such as isophoronediamine, 2-aminomethylpiperidine, 4-aminomethylpiperidine, 4,4'-diaminodicyclohexylenemethane, 4,4'-diamino-3,3'-dimethyldicyclohexylenemethane, 1,3-di(4-piperidyl)-propane, 1,2-diaminocyclohexane, 1,3-diaminocyclohexane, 1,4-diaminocyclohexane, N-aminopropylpiperazine, 4,4'-diaminodicyclohexylenepropane, 1,2-bis(aminomethyl)cyclohexane, 1,3-bis(aminomethyl)cyclohexane and 1,4-bis(aminopropyl)piperazine. The dicarboxylic acid includes, for example, straight-chain or branched-chain aliphatic dicarboxylic acids, such as succinic acid, propanedioic acid, butanedioic acid, pentanedioic acid, adipic acid, heptanedioic acid, octanedioic acid, nonanedioic acid, decanedioic acid, dodecanedioic acid, undecanedioic acid, dimer acid and hydrogenated dimer acid; aromatic dicarboxylic acids, such as phthalic acid, terephthalic acid, isophthalic acid, naphthalenedicarboxylic acid, 2-chloroterephthalic acid, 2-methylterephthalic acid, 5-methylisophthalic acid, and 5-sodium sulfoisophthalic acid and 1,5-naphthalenedicarboxylic acid; dicarboxylic acids having a non-aromatic cyclic group, such as 1,4-cyclohexanedicarboxylic acid, 1,2-cyclohexanedicarboxylic acid, 1,3-cyclohexanedicarboxylic acid, tetrahydrophthalic acid, tetrahydrophthalic anhydride, hexahydrophthalic acid, hexahydrophthalic anhydride, 3-methyl-1,2,3,6-tetrahydrophthalic anhydride, 4-methyl-1,2,3,6-tetrahydrophthalic anhydride, 3-methyl-1,2,3,6-tetrahydrophthalic acid, 4-methyl-1,2,3,6-tetrahydrophthalic acid, 3-methyl-hexahydrophthalic anhydride, 4-methylhexahydrophthalic anhydride, 3-methylhexahydrophthalic acid, and 4-methylhexahydrophthalic acid. The ω-aminoacids include, for example, 6-aminohexanoic acid, 11-aminoundecanoic acid, 12-aminododecanoic acid, 4-piperidinecarboxylic acid, 3-piperidinecarboxylic acid and 2-piperidinecarboxylic acid. The lactam includes e-caprolactam, undecanelactam, and lauryllactam.

Specific examples of the polyamide include polycaproamide (nylon 6), polydodecaneamide (nylon 12), polytetramethyleneadipamide (nylon 46), polyhexamethyleneadipamide (nylon 66), polyundecamethyleneadipamide (nylon 116), polymetaxylyleneadipamide (nylon MXD6), polyparaxylyleneadipamide (nylon PXD6), polytetramethylenesebacamide (nylon 410), polyhexamethylenesebacamide (nylon 610), polydecamethyleneadipamide (nylon 106), polydecamethylenesebacamide (nylon 1010), polyhexamethylenedodecamide (nylon 612), polydecamethylenedodecamide (nylon 1012), polyhexamethyleneisophthalamide (nylon 6I), polyhexamethyleneterephthalamide (nylon 6T), polybis(3-methyl-4-aminohexyl)methaneterephthalamide (nylon PACMT), polybis(3-methyl-4-aminohexyl)methaneisophthalamide (nylon PACMI), polybis(3-methyl-4-aminohexyl)methanedodecamide (nylon PACM12), polybis(3-methyl-4-aminohexyl)methanetetradecamide (nylon PACM14), polytetramethyleneterephthalamide (nylon 4T), polypentamethyleneterephthalamide (nylon 5T), poly-2-methylpentamethyleneterephthalamide nylon M-5T), polyhexamethylenehexahydroterephthalamide (nylon 6T(H)), poly2-methyl-octamethyleneterephthalamide, polynonamethyleneterephthalamide (nylon 9T), polydecamethyleneterephthalamide (nylon 10T), polyundecamethyleneterephthalamide (nylon 11T), polydodecamethyleneterephthalamide (nylon 12T), polybis(3-methyl-4-aminohexyl)methaneterephthalamide (nylon PACMT), polybis(3-methyl-4-aminohexyl)methaneisophthalamide (nylon PACMI), polybis(3-methyl-4-aminohexyl)methanedodecamide (nylon PACM12), and polybis(3-methyl-4-aminohexyl)methanetetradecamide (nylon PACM14). These may be used singly or in a mixture of two or more.

Furthermore, a copolymer obtained by any combination of the repeating units of polyamides also can be used. Such polyamide copolymer includes, though not restrictive, caprolactam/hexamethyleneadipamide copolymer (nylon 6/6,6), hexamethyleneadipamide/caprolactam copolymer (nylon 6,6/6), and hexamethyleneadipamide/hexamethylene-azelamide copolymer (nylon 6,6/6,9).

The inclusion of reinforcing fiber in the polyamide resin composition improves the strength of the component for fasteners. By surface treatment with a silane coupling agent, a titanate coupling agent, an aluminate coupling agent or the like, a polyamide can be expected to have a higher compatibility with the reinforcing fiber than conventional resins such as polyester, and therefore the polyamide can provide a high strength and a high rigidity without spoiling the strength even when the reinforcing fiber is added in a large amount. The higher the concentration of the reinforcing fiber in the polyamide resin, the higher strength can be obtained.

In consideration of the strength decrease before and after dyeing, in order to allow the component for fasteners after dyeing to have a predetermined strength, the concentration of the reinforcing fiber is preferably set to be 20% by mass or more and more preferably set to be 30% by mass or more. The upper limit of the content of the reinforcing fiber is not particularly limited; however, when the concentration of the reinforcing fiber is too high, the moldability is deteriorated, and the manufacturing efficiency is sometimes degraded. In consideration of the compatibility between the strength and the productivity of the component for fasteners, the concentration of the reinforcing fiber in the polyamide resin composition is preferably set to be 70% by mass or less.

The reinforcing fiber used in the present invention may include, but not limited to, for example, organic fiber such as carbon fiber and aramid fiber, as well as inorganic fiber such as glass fiber, an acicular wollastonite and whiskers (examples: calcium titanate whisker, calcium carbonate whisker, aluminum borate whisker). Preferably, any one or more selected from glass fiber, aramid fiber and carbon fiber are used, and glass fiber is more preferable in that the strength can be enhanced, while retaining flowability at a certain level or higher. These may be used singly or in combination of two or more.

Preferably, the mean fiber diameter of the reinforcing fibers before compounding with a resin is approximately 3 to 20 μm, and more preferably approximately 5 to 12 μm. Preferably, the mean fiber length of the reinforcing fibers before compounding with a resin is approximately 1 mm to 10 mm, and more preferably approximately 3 mm to 6 mm. It is noted that the fiber diameter refers to a diameter calculated from the cross section of the reinforcing fiber which has been determined, provided that the cross section is a perfect circle. Preferably, the aspect ratio, i.e., the mean fiber diameter : the mean fiber length, of the reinforcing fiber before compounding with a resin is 1:50 to 3:10000, and more preferably 1:300 to 1:1200. Typically, a mean fiber length of the reinforcing fiber is reduced to 1/10 to 1/20 of the initial fiber length after compounding with a resin and molding, and for example, is 0.1 to 1 mm, and typically 0.1 to 0.5 mm.

Although polyamide resins generally easily cause yellowing, thereby exhibiting low color reproducibility, the color reproducibility can be enhanced by adding a pigment. On the other hand, addition of the pigment in a high concentration is not preferred because the pigment added in an increased amount may reduce the strength or deteriorate the color reproducibility of the dyed layer formed on the surface due to excessive whiteness. Thus, in the present invention, the color reproducibility is ensured, while the pigment content being suppressed, by using a pigment having a refractive index of 2 or more, and preferably 2.5 or more, which has a high whiteness. In addition, a pigment with a high hardness easily breaks the reinforcing fiber in compounding them, and this adversely affects the strength of the molded product. Thus, in the present invention, high strength is ensured by using a pigment having a Mohs hardness of 4 or less and preferably 3.5 or less. Examples of the pigment satisfying such conditions include zinc sulfide and antimony oxide, and zinc sulfide is preferred from the viewpoint of safety.

Preferably, the content of the pigment in the polyamide resin composition is 0.5% by mass or more, and more preferably 1.0% by mass or more from the viewpoint of the color reproducibility. Also, the content of the pigment in the polyamide resin composition is preferably less than 5.0% by mass, and more preferably 4.5% by mass or less from the viewpoint of dark color dyeability. When the content of the pigment is too large, the color development of the dyed layer is difficult.

Pigments are generally granular or powdery, and an excessively large particle size thereof reduces opacifying properties, thereby lowering a whiteness per unit amount of addition. Therefore, the median size of the pigment is preferably 5.0 μm or less, and more preferably 3.0 μm or less. On the other hand, an excessively small particle size of the pigment causes agglomeration via a van der Waals force, and therefore the median size is preferably 0.1 μm or more, and more preferably 0.2 μm or more. The median size of the pigment is determined by a laser diffraction method according to JIS 8825-1: 2001.

Additionally, commonly used additives, such as a heat stabilizer, a weathering agent, a hydrolysis-resistant agent and other pigment, may be added into the polyamide resin composition such that the total content of these additives is, for example, 10.0% by mass or less. When other pigment is added, it is desirable that the above-described pigment having the predetermined Mohs hardness and refractive index accounts for 90% by mass or more, preferably 95% by mass, and still more preferably 100% by mass of the total pigments.

(Color of Molded Component)

The molded component formed of a polyamide resin composition constituting the component for fasteners according to an embodiment of the present invention is regulated with respect to the color of the molded component in such a way that when the color of the molded component is evaluated according to JIS Z8729: 2004 (color specification), the $L^*$, $a^*$ and $b^*$ values satisfy the following ranges, respectively:

$80<L^*<95$, $-5<a^*<5$, and $0<b^*<10$.

The color of the molded component can take as the reference the color of the central part of the cross section of the molded component. In the molded component before the dyeing, there is little color difference between the surface and the central part, and accordingly, the color of the surface of the molded component may also be taken as the reference of the color. The method for measuring the color of the molded component is, for example, a method in which the molded component is vertically cut, and the central part of the resulting cross section is subjected to color measurement according to JIS Z8729: 2004 (color specification). By regulating the color of the molded component so as to fall within the above-described ranges, the effect of the yellowing of the polyamide resin can be reduced, and accordingly, it is possible to obtain a component for fasteners, high in color reproducibility with a thin dyed layer and capable of reproducing more uniform color tone on the whole surface.

In consideration of the color reproducibility of the component for fasteners, the brightness ($L^*$) of the color of the central part of the cross section of the molded component is set to satisfy more preferably the relation $85<L^*<95$ and furthermore preferably the relation $88<L^*<95$. The chromaticity ($a^*$) of the central part of the cross section of the molded component is set to satisfy more preferably the relation $-3<a^*<3$ and furthermore preferably the relation $-2<a^*<1$. The chromaticity ($b^*$) of the central part of the cross section of the molded component is set to satisfy more preferably the relation $0<b^*<9$ and furthermore preferably the relation $2<b^*<8$.

By setting the color of the molded component so as to fall within the above-described ranges, even when the dyed layer is made to be, for example, a thin layer of 100 μm or less in thickness, the effect of the discoloration of the base color due to the inclusion of a polyamide resin or glass fiber is made to be hardly exerted on the dyed layer, and thus, it is possible to dye the dyed layer in a desired color with a small amount of dye. The $L^*$, $a^*$ and $b^*$ values may also be regulated so as to fall within the above-described ranges during production.

(Thickness of Dyed Layer)

The thinner the thickness of the dyed layer formed inward from the surface of the molded component, the more effectively the decrease of the strength of the molded component due to dyeing can be suppressed and at the same time, in the shorter time the drying operation can be performed; hence, the thin dyed layer is preferable for the purpose of achieving the compatibility between strength and productivity. However, when the thickness of the dyed layer is too thin, the color reproducibility is sometimes not obtained sufficiently. On the other hand, when the dyed layer is formed to be too thick, the amount of the dye required for dyeing is increased and the time required for dyeing is also increased to degrade the productivity. In addition, the formation of the too thick dyed layer may cause in-plane color unevenness in the dyed layer, and thus, the uniformity of the dyed layer surface is sometimes degraded.

In the present embodiment, from the viewpoint of the compatibility between color reproducibility and productivity, the thickness of the dyed layer is set preferably to be at least approximately 30 μm or more and is more preferably at least approximately 40 μm or more. The upper limit of the thickness of the dyed layer is not particularly limited; however, the upper limit of the thickness of the dyed layer is preferably 100 μm or less and more preferably 90 μm or less.

One of the simplest measurement method of the thickness of the dyed layer is a method in which the molded component after dyeing is vertically cut, and the resulting cross section is observed with a microscope or the like. In this case, the thickness of the dyed layer is determined while comparing the color tone originally possessed by the molded component (for example, the color of the central part of the cross section of the molded component) with the color tone of the central part of the surface of the dyed layer of the molded component.

The definition of the thickness of the dyed layer of the molded component is as follows. By using a microtome (manual rotation type microtome: RM2125RT, made by Leika), from the condition that a slicing blade is placed on the surface of the molded component, the 1-μm thick surface layer is repeatedly sliced off, and the depth of slicing when the numerical values of the tint of color of the base material (in the present embodiment, $80<L^*<95$, $-5<a^*<5$, $0<b^*<10$) is reached is taken as the dyeing thickness.

The evaluation of the dyed layer based on the chemical quantitative determination can be performed by using a C-NMR (Fourier transform nuclear magnetic resonance spectrometer: JNM-EX400 made by JEOL Ltd.). By analyzing the above-described microtome specimen with C-NMR, the dyed layer can be identified through detecting the shifts of the chromophores of the acidic dye such as an aromatic azo compound or an anthraquinone derivative. The dyed layer can also be identified by identifying the sulfur of a sulfonic acid salt as a soluble component of the acidic dye, by using an EPMA (electron beam probe microanalyzer: EPMA1610 made by Shimadzu Corp.).

The method for forming the dyed layer is not particularly limited, but dip dyeing and printing are representative. With respect to the dye, though not restrictive, premetallized dyes, acidic dyes, thren dyes and disperse dyes are suitable, and among others, acidic dyes can be particularly suitably used because of good dyeing affinity and fastness.

(Color of Dyed Layer)

The dyed layer obtained by the present embodiment is dyed in such a way that the color of the whole surface of the molded component is uniform. For example, when the colors of 10 measurement points on the surface of the dyed layer are subjected to the color measurement (measurement according to JIS Z8729: 2004 (color specification)), the average value of the color differences from the average value for the 10 points, of the respective measurement points is 1.0 or less, more preferably 0.9 or less and furthermore preferably 0.8 or less. Color difference ($\Delta E^*ab$) can be evaluated by the following formula:

$$\Delta E^*ab = [(\Delta L^*)^2 + (\Delta a^*)^2 + (\Delta b^*)^2]^{1/2}$$

(Component for Fasteners)

Figure 1:
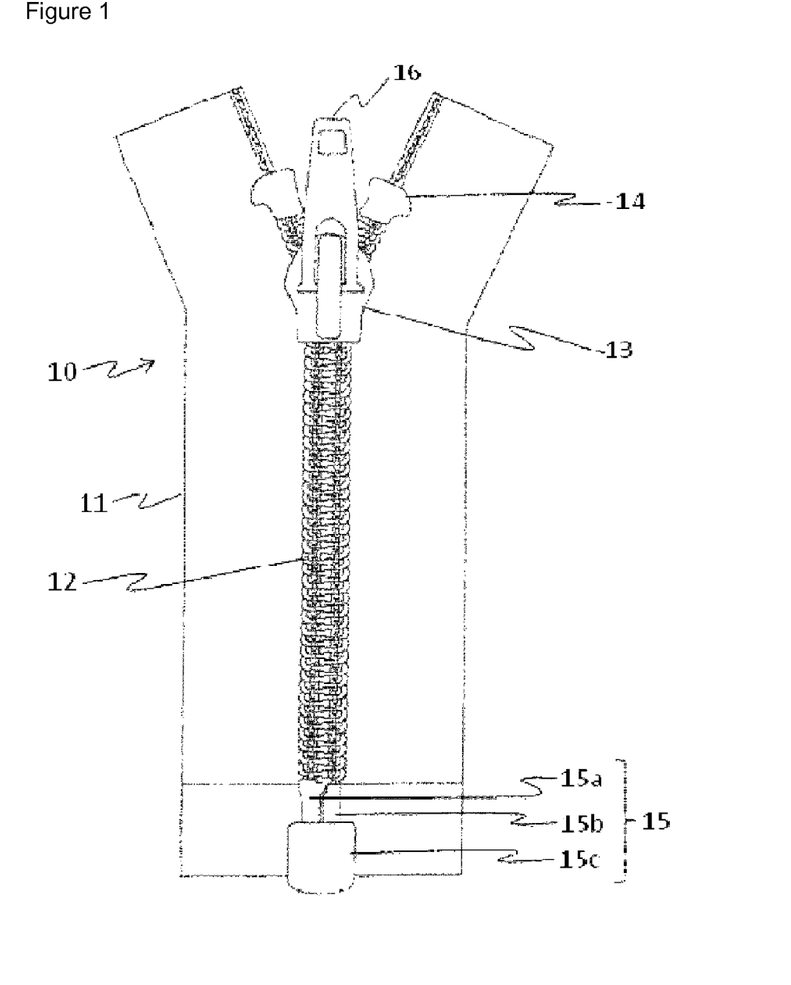
FIG. 1 is a front view showing an example of constitution of a slide fastener.

The component for fasteners according to the present invention can be applied to each of the constituent components of the slide fastener 10 as shown as an example in FIG. 1.

The slide fastener 10 is mainly composed of three parts: a pair of long tapes 11, a number of elements 12 which are engaging parts of the fastener sewn on along one side edge of each tape, and a slider 13 to control opening and closing of the fastener by engaging and separating the elements 12. A top end stop 14 and an opening device 15 can be further provided to prevent dropping off of the slider 13, and a pull tab 16 can be attached on the front face of the slider 13. The opening device 15 can be composed of an insert pin 15*a* and a box body 15*c* with a box pin 15*b*. The slider 13 releases engagement between elements 12, while being moved to the opening device 15 provided at the bottom parts of the long tapes 11, and then, the insert pin 15*a* is pulled out from the box body 15*c* to separate each tape 11.

By using the resin composition according to the present embodiment, at least one of these molded components for slide fasteners can be manufactured; in particular, the resin composition according to the present invention can be suitably used as the materials for the slider and the pull tab. In addition, a variety of slide fasteners comprising the component for fasteners can be manufactured. The type of the element, which is an engaging part of the slide fastener, is not particularly limited, but includes, for example, a coil fastener, an extrusion fastener and an injection fastener.

(Manufacturing Method)

Description is provided with respect to an example of the method for manufacturing a component for fasteners using the resin composition according to the present invention. First, a polyamide, which is an ingredient of the resin composition, reinforcing fiber, a pigment and the like are sufficiently kneaded so as not to cause bias of the ingredients. Kneading can be carried out using a single screw extruder, a twin screw extruder, a kneader or the like. The kneaded resin composition is injection-molded utilizing a mold having a predetermined shape to complete a molded component. The injection molding conditions are not particularly limited, but a twin screw extruder can be suitably used. In the case of glass fiber in a high concentration, it is preferred to compound the glass fiber with a resin in a molten state using a side feeder in terms of productivity. With respect to the injection molding conditions, from the viewpoint that high productivity can be ensured without deterioration, the cylinder temperature is preferably set to a range of 280 to 320° C., and the mold temperature is preferably set to, for example, 90 to 130° C., which is higher than usual.

For the purpose of enhancing the gloss feeling, the surface of the molded component may be regulated so as to have a ten-point average roughness of 6 μm or less, more specifically, 0.1 to 6 μm. The ten-point average roughness is determined using a noncontact surface roughness measuring instrument using a laser microscope. Subsequently, the dyed layer having a thickness of 30 to 100 μm is formed on the surface of the resulting molded component to complete a variety of the components for fasteners.

EXAMPLES

Hereinafter, Examples of the present invention will be presented, but these are provided in order for a better understanding of the present invention and advantages thereof, and not intended that the present invention is limited thereto.

As the polyamide resin (PA) according to Examples, nylon 66 (polyhexamethyleneadipamide) having a melting point of 265° C. was used. The melting point of the polyamide resin was measured by using DSC EXSTAR6000 (made by Seiko Instruments Inc.) with a sample amount of 5 to 10 mg and under a $N_2$ gas atmosphere under the condition of a heating rate of 10° C./min. As the resin for Comparative Example, polybutylene terephthalate (Toraycon 1101G30) was used.

As reinforcing fiber, glass fiber (GF) having a mean fiber diameter of 11 μm, a mean fiber length before molding of 3 mm and a mean fiber length after molding of 0.25 mm was used. As a pigment, zinc sulfide (ZnS) having a Mohs hardness of 3 and a refractive index of 2.4 was used.

Zinc sulfide was added as a pigment in a content of 2% by mass, and was kneaded with the above-described resin and glass fiber by using a twin screw extruder (TEM-18SS made by Toshiba Machine Co., Ltd.). In the kneading, the screw rotational frequency and the discharge per hour were set to 150 rpm and 3 kg/h, respectively, and the glass fiber only was side-fed. In the case where the polyamide resin was used, the content of the glass fiber was varied to be 0, 20, 30 and 60% (mass basis) to prepare molten resins. Each molten resin was extruded in a strand form from the die, cooled to be solidified in a cooling water bath, and then cut by a pelletizer to give a pellet of each resin composition. The pellets of the resin compositions were injection-molded to form specimens of 80×20×4 mm different in the content of glass fiber from each other.

Figure 2:
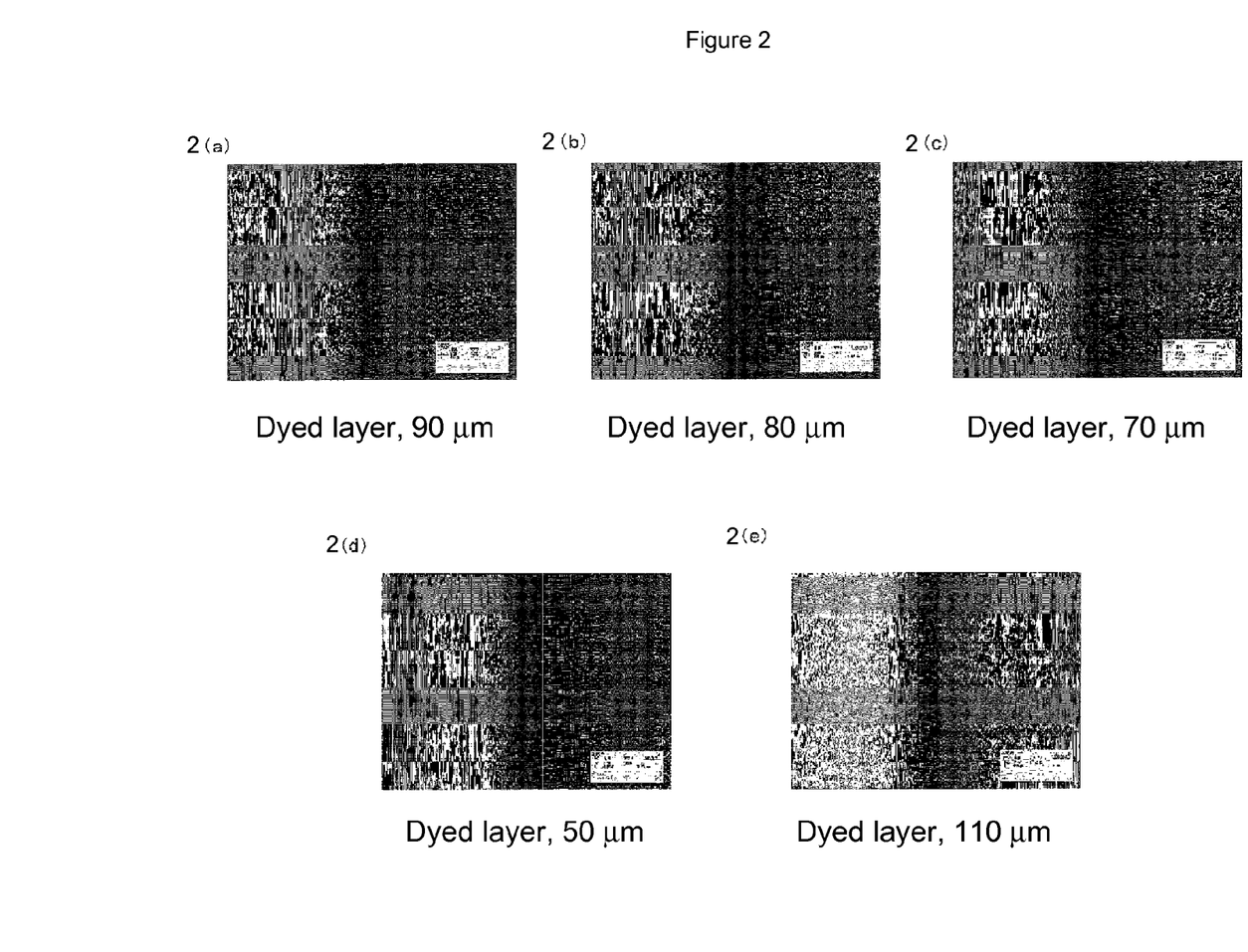
FIG. 2 shows the formation states of the dyed layers.
Figure 3:
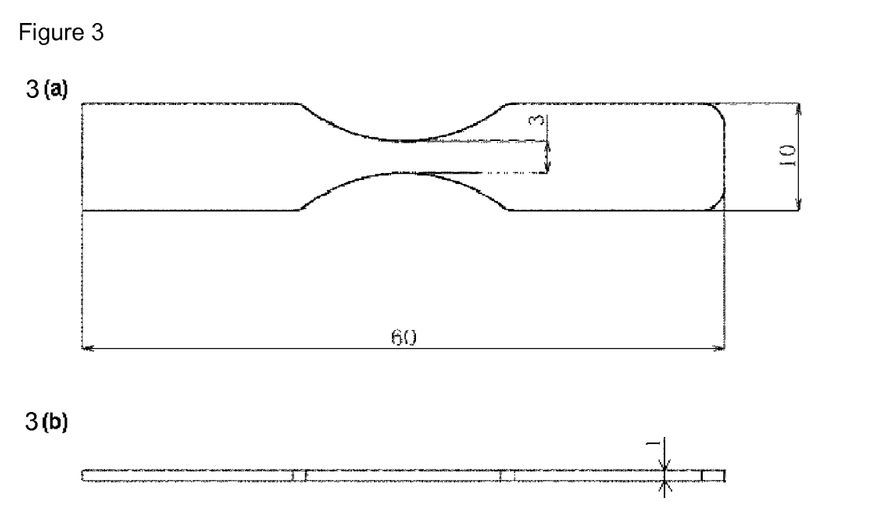
FIG. 3(a) is a plan view for illustrating the shape of the specimen (dumbbell specimen) used to evaluate the mechanical properties of the component for fasteners according to an embodiment of the present invention.
FIG. 3(b) is a side view for illustrating the thickness of the specimen of FIG. 3(a).

For each resulting specimen, the dyed layer was formed on the surface of the specimen by using a pot-type dyeing machine, with an acidic dye under the conditions that the dye concentration was 1.0% by mass, the dyeing temperature was 100° C., and the dyeing time was 30 minutes. For the specimen of Comparative Example, the dyed layer was formed on the surface of the specimen with a disperse dye under the conditions that the dye concentration was 1.0% by mass, the dyeing temperature was 130° C., and the dyeing time was 30 minutes. The formation states of the dyed layers are shown in FIG. 2(*a*) to FIG. 2(*e*).

<Colorimetric Values of Base Color>

Each resulting specimen was cut along the cross section perpendicular to the surface of the dyed layer, and for the central part of the cross section, the L*, a* and b* values were measured according to JIS Z8729: 2004 (color specification) and taken as the color of the molded component (colorimetric values of base color). The measurement results are shown in Table 1.

<Thickness of Dyed Layer>

From the surface of the dyed layer of each specimen, the 1-μm thick surface layer is repeatedly sliced off, and the tint of color, namely the L*, a* and b* values, of the surface of the specimen after slicing was measured according to JIS Z8729: 2004 (color specification). For each specimen, the depth of slicing when the obtained measurement values reached the L*, a* and b* values of the central part of the cross section was evaluated as the thickness of the dyed layer. The measurement results are shown in Table 1.

<Dyeing Uniformity>

With respect to the evaluation of the dyeing uniformity of the dyed layer, the L*, a* and b* values were measured for each of arbitrary 10 measurement points on the surface of the dyed layer according to JIS Z8729: 2004(color specification). Subsequently, the average values of the L*, a* and b* values of the 10 measurement points were determined, and the color differences (ΔE*ab) of the respective measurement points from the resulting average value were averaged to derive the average (the average color difference within the dyed layer). The measurement results are shown in Table 1. In Table 1, "PA66" represents the polyamide resin (nylon 66) according to the present embodiment, "PBT" represents the polybutylene terephthalate and "GF" represents reinforcing fiber (glass fiber).

TABLE 1

| Base resin | Dye type | Dyed layer thickness [μm] | Colorimetric values of base color L* | a* | b* | Color difference within dyed layer ΔE*ab |
|---|---|---|---|---|---|---|
| PA66 + GF 0% | Acidic dye | 90 | 94.4 | −1.5 | 3.0 | 1.40 |
| PA66 + GF 20% | Acidic dye | 80 | 92.7 | −1.7 | 5.4 | 0.59 |
| PA66 + GF 30% | Acidic dye | 70 | 92.3 | −1.8 | 6.3 | 0.43 |
| PA66 + GF 60% | Acidic dye | 50 | 89.2 | −1.3 | 7.7 | 0.77 |
| PBT + GF 30% | Disperse dye | 110 | 89.5 | −2.1 | 3.6 | 1.19 |

As can be seen from Table 1 and FIG. 2(a) to FIG. 2(d), the inclusion of reinforcing fiber in the polyamide resin allows components for fasteners high in color reproducibility to be obtained even when the dyed layers are thin layers of 100 μm or less in thickness. In addition, as the content of the reinforcing fiber was increased, the thickness of the dyed layer was able to be made smaller. Moreover, it can be seen the inclusion of reinforcing fiber in the polyamide resin has reduced the color difference within the dyed layer, and has achieved the dyeing uniformity on the whole surface of the dyed layer. On the other hand, in the case as Comparative Example where PBT was used as the base resin, the thickness of the dyed layer was thicker and the color difference was larger as compared with Examples using the polyamide.

(Mechanical Properties)

Nylon 66 having a melting point of 265° C. was used as the polyamide resin according to Examples, and zinc oxide as a pigment in a content of 2% by mass, and glass fiber as reinforcing fiber in contents of 0% by mass, 20% by mass, 30% by mass or 60% by mass were added to nylon 66; the resulting mixtures were kneaded to prepare molten resins.

Each of the molten resins was placed in a mold to be molded, and thus there was prepared a dumbbell shaped specimen of 60 mm in the total length (longitudinal direction), 10 mm in the width (transverse direction) of the ends, 3 mm in the width (transverse direction) of the narrow portion in the central part of the specimen, and 1 mm in thickness. For each of the resulting specimens, a dyed layer was formed on the surface of the specimen by using a pot-type dyeing machine, with an acidic dye under the conditions that the dye concentration was 1.0% by mass, the dyeing temperature was 100° C., and the dyeing time was 30 minutes.

The tensile strengths before and after dyeing of each of the specimens were measured by a tensile test according to JIS K7161, 7162. The measurement results are shown in Table 2.

TABLE 2

| Base resin | Dye type | Dyed layer thickness [μm] | Tensile strength [N] Before dyeing | After dyeing | Decrease rate |
|---|---|---|---|---|---|
| PA66 + GF 0% | Acidic dye | 90 | 235 | 129 | −45% |
| PA66 + GF 20% | Acidic dye | 80 | 453 | 309 | −32% |
| PA66 + GF 30% | Acidic dye | 70 | 555 | 411 | −26% |
| PA66 + GF 60% | Acidic dye | 50 | 615 | 532 | −13% |

As can be seen from Table 2, in the molded components according to Examples, although the strength decrease was found from before to after dyeing, the increase of the content of the reinforcing fiber enabled to achieve the more improvement of the tensile strength or was able to reduce the effect of the strength decrease, and thus the strength required as the component for fasteners was able to be obtained.

REFERENCE SIGNS LIST

10 Slide fastener
11 Long tapes
12 Elements
13 Slider
14 Top end stop
15 Opening device
16 Pull tab

The invention claimed is:

1. A component for fasteners, comprising a molded component formed of a polyamide resin composition including reinforcing fiber,
   wherein a dyed layer being dyed inward from a surface of the molded component is disposed, and the thickness of the dyed layer is 30 to 100 μm.

2. The component for fasteners according to claim 1, wherein when a color of a central part of a cross section of the molded component is evaluated according to JIS Z8729: 2004 (color specification), L*, a* and b* values satisfy the following ranges, respectively:

80<L*<95, −5<a*<5, and 0<b*<10.

3. The component for fasteners according to claim 1, comprising the reinforcing fiber in a content of 20 to 70% by mass.

4. The component for fasteners according to claim 1, wherein when colors of arbitrary 10 measurement points on the surface of the dyed layer are measured, an average value of color differences (ΔE*ab), from an average value of the 10 measurement points, of the respective measurement points is 1.0 or less.

5. The component for fasteners according to claim 1, wherein the polyamide resin composition includes an aliphatic polyamide, and the reinforcing fiber is glass fiber.

6. The component for fasteners according to claim 1, wherein the polyamide resin composition includes, in addition to the reinforcing fiber, a polyamide resin having a melting point of 210° C. or higher and lower than 310° C., and a pigment having a Mohs hardness of 4 or less and a refractive index of 2 or more in a content of 0.5% by mass or more and less than 5% by mass.

7. A slide fastener comprising the component for fasteners according claim 1.

8. A method for manufacturing a component for fasteners, comprising:
   (a) manufacturing a molded component using a polyamide resin composition including reinforcing fiber; and
   (b) forming a dyed layer having a thickness of 30 to 100 μm, inward from a surface of the molded component.

9. The method for manufacturing a component for fasteners according to claim 8, wherein in the step (a), the color of the molded component is regulated in such a way that when a color of a central part of a cross section of the molded component is evaluated according to JIS Z8729: 2004 (color specification), L*, a* and b* values satisfy the following ranges, respectively:

80<L*<95, −5<a*<5, and 0<b*<10.

10. The method for manufacturing a component for fasteners according to claim 8, wherein in the step (a), the reinforcing fiber is included in a content of 20 to 70% by mass.

* * * * *

UNITED STATES PATENT AND TRADEMARK OFFICE
CERTIFICATE OF CORRECTION

PATENT NO. : 9,827,700 B2
APPLICATION NO. : 14/891583
DATED : November 28, 2017
INVENTOR(S) : Kazuya Mizumoto et al.

Page 1 of 1

It is certified that error appears in the above-identified patent and that said Letters Patent is hereby corrected as shown below:

In the Specification

In Column 2, Line 61, delete "28729:" and insert -- Z8729: --, therefor.

In Column 3, Line 32, delete "28729:" and insert -- Z8729: --, therefor.

In Column 5, Line 26, delete "e-caprolactam," and insert -- ε-caprolactam, --, therefor.

In Column 5, Line 47, delete "nylon" and insert -- (nylon --, therefor.

In Column 7, Line 41, delete "28729:" and insert -- Z8729: --, therefor.

In Column 7, Line 55, delete "28729:" and insert -- Z8729: --, therefor.

In Column 9, Line 19, delete "28729:" and insert -- Z8729: --, therefor.

In Column 11, Line 5, delete "28729:" and insert -- Z8729: --, therefor.

In Column 11, Line 23, delete "28729:" and insert -- Z8729: --, therefor.

In the Claims

In Column 14, Line 2, in Claim 7, after "according" insert -- to --.

Signed and Sealed this
Fourth Day of December, 2018

Andrei Iancu
*Director of the United States Patent and Trademark Office*